W. E. ROYSE.
DRAFT EQUALIZER.
APPLICATION FILED APR. 28, 1908.
906,298.
Patented Dec. 8, 1908.
2 SHEETS—SHEET 1.
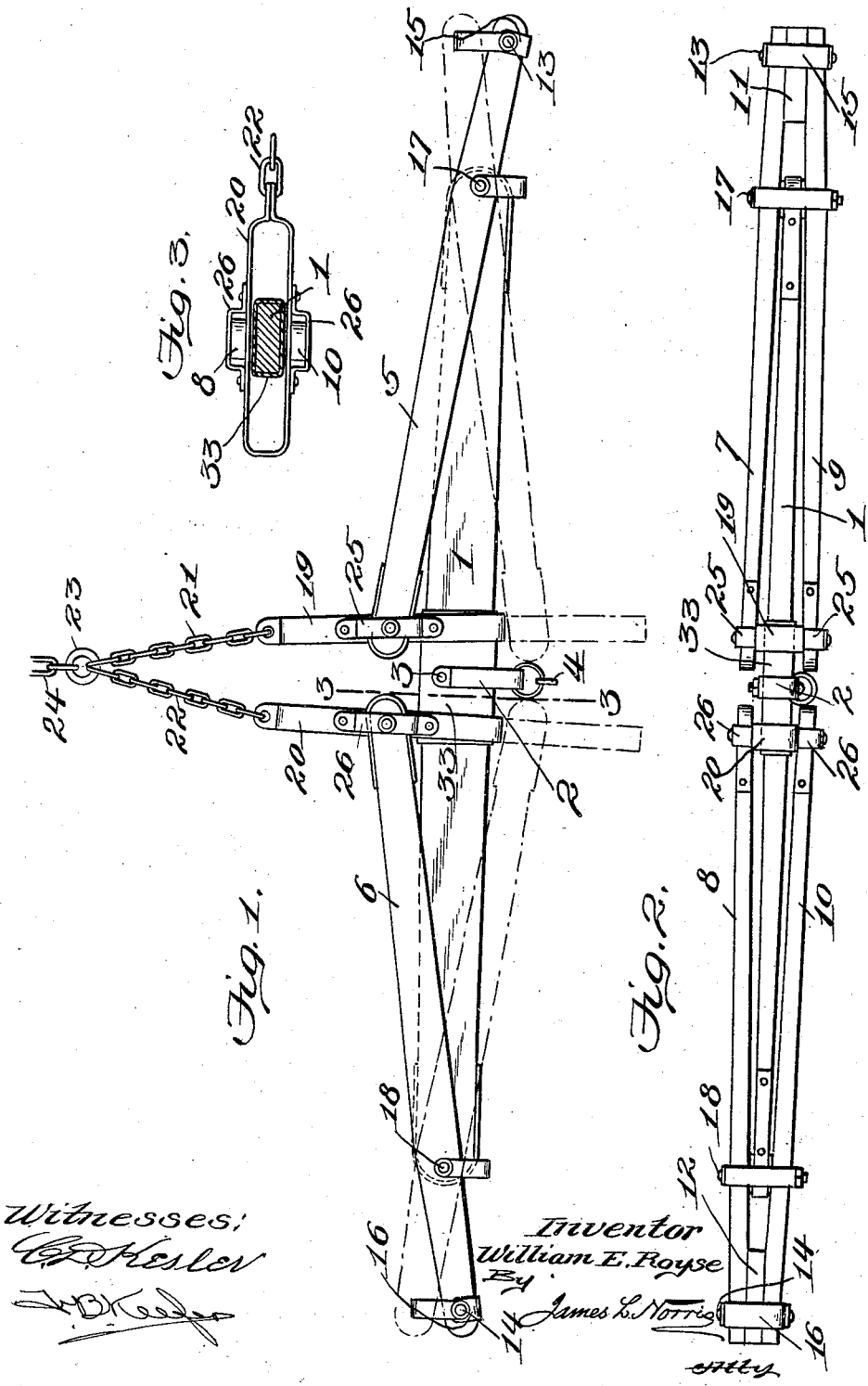
Witnesses:
Inventor
William E. Royse
By James L. Norris
Atty.

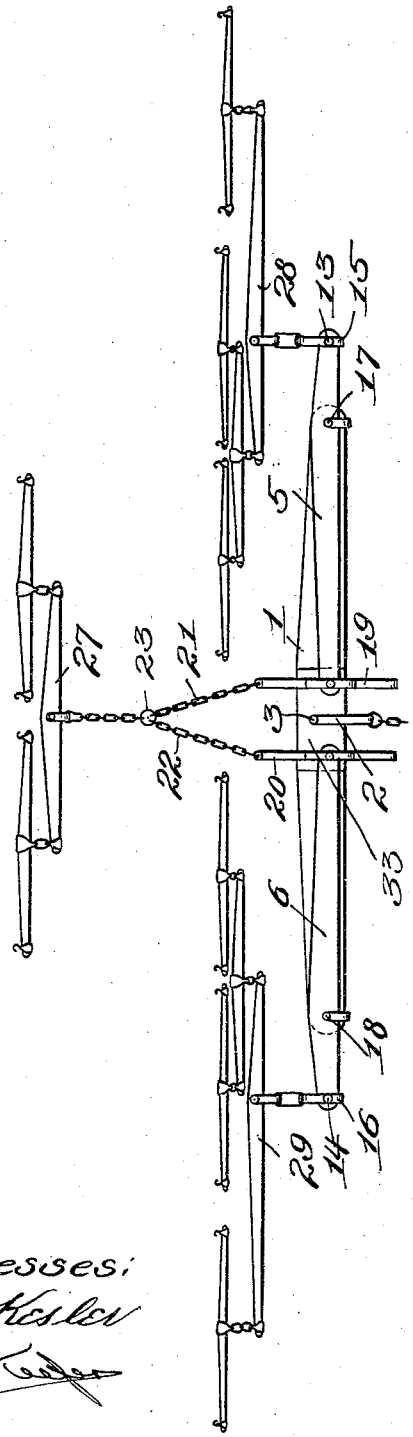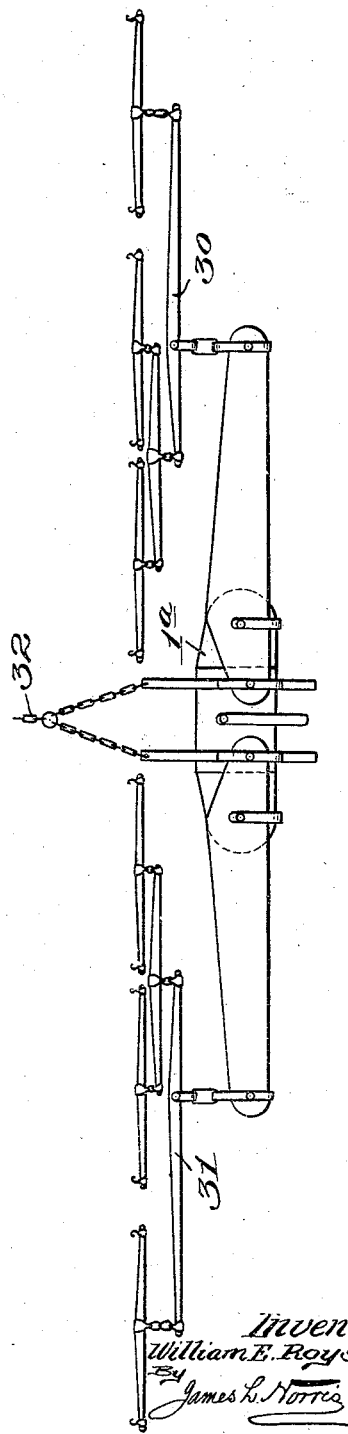

UNITED STATES PATENT OFFICE.

WILLIAM EDWARD ROYSE, OF HEPPNER, OREGON.

DRAFT-EQUALIZER.

No. 906,298.    Specification of Letters Patent.    Patented Dec. 8, 1908.

Application filed April 28, 1908.  Serial No. 429,704.

*To all whom it may concern:*

Be it known that I, WILLIAM EDWARD ROYSE, a citizen of the United States, residing at Heppner, in the county of Morrow and State of Oregon, have invented new and useful Improvements in Draft-Equalizers, of which the following is a specification.

My present invention relates to improvements in draft equalizers and more especially to the type adapted for use in hauling combined harvesters, plows and other apparatus requiring the use of a great number of draft animals, and it has for its object primarily to provide an improved draft apparatus of this character which is capable of being hitched up in different combinations according to the number of draft animals it is necessary to use and which in practice serves to effectually equalize the draft of the animals so that each animal may exert a pull according to its individual strength, and the machine to which the draft apparatus is attached may be more readily started and moved with an even motion, the draft bars and their coöperating equalizing levers being so constructed and assembled that injury or tangling of the animals therewith is avoided.

Another object of the invention is to provide an improved draft bar and equalizing levers, the latter being each composed of upper and lower members which are arranged at opposite sides of the draft bar and are both connected at their inner ends by clevises which embrace the draft bar, these clevises serving not only to communicate the draft equally to the equalizing levers, but also to limit the swinging movements of these levers relatively to the draft bar so that there are no spaces between these parts at any time into which the leg of the animal may be caught and injured, although sufficient swinging movement is provided for these levers to insure a sufficient equalizing action.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a plan view of a draft bar and a pair of equalizing levers pivoted on the outer ends thereof, the full and dotted lines indicating the limits of the swinging movements of the equalizing levers relatively to the draft bar; Fig. 2 represents a rear edge view of the draft bar and equalizing lever shown in Fig. 1; Fig. 3 represents a transverse section on the line 3—3 of Fig. 1; and Figs. 4 and 5 are plan views of a pair of draft bars and their coöperating equalizing levers showing the hitching devices for the horses, the draft bar shown in Fig. 4 being adapted for use at the forward end of the team, while that shown in Fig. 5 is adapted for use at the rear of the team.

Similar parts are designated by the same reference characters in the several views.

Draft apparatus constructed in accordance with my present invention is capable of use generally for hitching draft animals to vehicles or apparatus of various kinds, it being necessary only to connect up the draft bars in different combinations according to the number of horses to be used and the nature of the work to be performed. In some cases, a single draft bar provided with a pair of equalizing levers may be used upon a vehicle, while in other cases, a number of these draft bars and their respective equalizing levers may be connected up to be used in connection with combined harvesters, gang plows and other apparatus requiring a considerable number of draft animals to operate them.

Each element of the draft apparatus comprises a draft bar 1 which may be composed of a timber of appropriate length, thickness and width, the draft bar having a loop-shaped clevis 2 attached by means of a bolt 3 to an intermediate portion thereof, and a draft chain 4 may be attached to this clevis and extended rearwardly either to the vehicle or to a draft bar immediately at the rear. Upon the opposite ends of the draft bar are pivoted a pair of equalizing levers 5 and 6, these levers being of an appropriate length and leverage according to the circumstances. These levers are composed respectively of the upper members 7 and 8 and the lower members 9 and 10 which are arranged at the top and bottom of the draft bar, the outer ends of the members being connected rigidly by means of the interposed blocks 11 and 12 through which the bolts 13 and 14 extend straps 15 and 16 being secured to the outer ends of the equalizing levers by means of these respective bolts, and these straps provide means for attaching the swinging trees thereto. The equalizing levers are pivoted for swinging movement with respect to the draft bar by means of the bolts 17 and 18 which extend through the upper and lower members of the respective levers and through the draft bar interposed between them. The inner ends of the respective levers are connected to a pair of clevises 19 and 20 which serve the dual function of transmitting the draft to the equalizing levers and also limiting the relative swinging movement of the levers with relation to the draft bar. In the present instance, each of these clevises is composed of a loop of metal of a width sufficient to embrace the top and bottom of the draft bar and elongated in a horizontal direction and to such an extent as to permit the necessary swinging movements of the respective equalizing lever in order to equalize the draft, the opposite ends of the loop, however, being arranged to engage the forward or rear edges of the draft bar and thus limit the swinging movements of the equalizing lever at such points as to avoid the forming of spaces between the inner ends of these levers and the draft bar sufficient to permit the entrance of the leg of the animal. These clevises preferably slide upon and engage a sleeve of metal 33 which surrounds the central portion of the draft bar so as to minimize wear of the latter. In the present instance, each of these clevises is composed of a strip of metal bent to form the flattened or elongated loop, and the ends of the strip are brought together so as to form an attaching eye. A pair of branch chains 21 and 22 are attached to the eyes on the forward ends of the respective clevises, the forward ends of these branch chains being united by a ring 23 which in turn is connected to a central draft chain 24. The inner ends of both members of each equalizing lever are pivotally attached to the respective clevis, and in order to insure the requisite strength, pairs of brackets 25 and 26 are riveted or otherwise secured to the upper and lower sides of each clevis so as to engage the top and bottom respectively of the upper and lower members.

In using the draft bar and its coöperating equalizing levers in connection with a combined harvester or other apparatus requiring the use of a considerable number of horses, the double tree 27 to which the swingle trees for the lead horses are attached is connected to the central draft chain leading forwardly from the clevises on the foremost equalizing levers, the equalizer bars 28 and 29 being attached to the clevises 15 and 16 on the outer ends of the respective equalizing levers of the foremost draft bar 1, the leverage of the equalizing levers being such that the horses connected to the equalizing bars 28 and 29 will substantially balance the draft of the horses connected to the double tree 27. The rearmost draft bar 1ª is attached to the apparatus to be hauled and it is provided with equalizing levers which are similar to those used on the foremost draft bar, except that the leverage of these levers is such that the draft of the horses connected to the equalizing bars 30 and 31 substantially balances the draft applied by the central draft chain 32 from all the horses in front to the clevises attached to the inner ends of the rearmost equalizing levers, and it will be understood, of course, that any suitable number of draft bars may be ranged intermediate of the foremost and rearmost draft bars, the leverage of the equalizing levers on these intermediate draft bars being of course proportioned according to the draft of the horses ahead of them. By providing equalizing levers composed of a pair of upper and lower members, a very strong construction is afforded without the necessity of making these parts unduly heavy.

I claim as my invention:

1. A draft equalizer comprising a draft bar, a pair of equalizing levers pivoted toward the opposite ends thereof, and a pair of clevises attached to the inner ends of the respective levers and guided to move transversely of the draft bar, said clevises having portions to coöperate with the front and rear edges of the draft bar to limit swinging movements of the equalizing levers in either direction.

2. A draft equalizer comprising a draft bar, a pair of equalizing levers pivoted toward the opposite ends thereof, a pair of clevises pivotally attached to the inner ends of the respective levers and straddling the draft bar so as to slide transversely on the draft bar, a central draft chain, and a pair of branch chains connected to the central draft chain and to the respective clevises.

3. A draft equalizer comprising a draft bar, a pair of equalizing levers pivoted toward the opposite ends thereof, a pair of clevises pivotally attached to the respective levers and guided on the draft bar to slide transversely thereof, portions of said clevises being arranged to coöperate with the forward and rear edges of the draft bar to limit the relative swinging movements of the equalizing levers, and means attached to the clevises for transmitting the draft to the equalizing levers.

4. A draft equalizer comprising a draft bar, a pair of equalizing levers pivoted toward the opposite ends thereof, a pair of clevises attached to the inner ends of the respective levers and straddling the draft bar and having portions to coöperate with the front and rear edges of the draft bar to limit the swinging movements of the equalizing levers in either direction, and a clevis attached directly to the draft bar midway between said movable clevises.

5. A draft equalizer comprising a draft bar, a pair of equalizing levers pivoted toward the opposite ends thereof, and a pair of clevises pivotally attached to the inner ends of the respective levers, each clevis being in the form of a horizontally elongated loop, the upper and lower sides of which are adapted to slidingly engage the top and bottom of the draft bar, and the ends of which are adapted to abut against the forward and rear edges of the draft bar to limit the relative pivotal movements of its respective lever.

6. A draft equalizer comprising a draft bar, a pair of equalizing levers pivoted toward the opposite ends thereof, each lever comprising a pair of upper and lower members rigidly connected at their outer ends and arranged at the top and bottom of the draft bar, and a pair of clevises, each clevis being in the form of an elongated loop which straddles the draft bar and having front and rear end portions arranged to engage the draft bar to permit limited transverse movement of said clevis thereon, the upper and lower sides of each clevis being pivotally attached to the inner ends of the respective members of the corresponding lever, and means for transmitting draft to both clevises.

7. A draft equalizer comprising a draft bar, a pair of equalizing levers pivoted on the opposite ends thereof, each lever comprising a pair of upper and lower members rigidly connected at their outer ends and arranged at the top and bottom of the draft bar, and a pair of clevises for transmitting the draft to the equalizing levers, each clevis comprising a strip of metal in the form of an elongated loop, the upper and lower sides of each loop being pivotally attached to the inner ends of the respective members of the corresponding lever and slidingly engage the top and bottom of the draft bar, and the ends of the loop being adapted to engage the front or rear edge of the draft bar to limit the relative swinging movement of the respective equalizing lever in either direction.

8. A draft equalizer comprising a draft bar, a pair of equalizing levers pivoted on the opposite ends thereof, each lever comprising a pair of upper and lower members rigidly connected at their outer ends and arranged at the top and bottom of the draft bar, a pair of clevises spaced longitudinally of the draft bar, each clevis being composed of a strip of metal in the form of a loop, the upper and lower sides of which are pivotally attached to the inner ends of the respective members of the corresponding lever and are guided to slide transversely on the draft bar, and the ends of the loop being arranged to engage the forward or rear edges of the draft bar to limit the relative swinging movements of the respective lever, a central draft chain, a pair of branch chains connected thereto and attached to the respective forward ends of the clevises, and a clevis attached directly to the draft bar at a point intermediate between the movable clevises.

In testimony whereof I have hereunto set my hand in presence of two subscribing witnesses.

WILLIAM EDWARD ROYSE.

Witnesses:
CLARENCE A. BATEMAN.
CHAS. S. HYER.